(12) United States Patent
Hassard et al.

(10) Patent No.: US 6,568,181 B1
(45) Date of Patent: May 27, 2003

(54) APPARATUS FOR EXTRACTING POWER FROM A FLUID FLOW

(75) Inventors: John Francis Hassard, London (GB); Geoffrey Kenneth Rochester, London (GB)

(73) Assignee: Imperial College Innovations Limited, London (GB)

(*) Notice: Subject to any disclaimer, the term of this patent is extended or adjusted under 35 U.S.C. 154(b) by 0 days.

(21) Appl. No.: 09/719,145

(22) PCT Filed: Jun. 14, 1999

(86) PCT No.: PCT/GB99/01876

§ 371 (c)(1),
(2), (4) Date: Feb. 26, 2001

(87) PCT Pub. No.: WO99/66200

PCT Pub. Date: Dec. 23, 1999

(30) Foreign Application Priority Data

Jun. 12, 1998 (GB) .............................................. 9812792
Jan. 21, 1999 (GB) .............................................. 9901350

(51) Int. Cl.⁷ .............................................. F16D 31/02
(52) U.S. Cl. ........................................ 60/398; 290/54
(58) Field of Search .............................. 60/398; 415/4.2, 415/2.1, 3.1, 4.1, 4.3, 4.5; 290/54, 55; 405/77

(56) References Cited

U.S. PATENT DOCUMENTS

| | | | | |
|---|---|---|---|---|
| 264,164 A | * | 9/1882 | Jackson ..................... | 290/55 X |
| 1,742,068 A | * | 12/1929 | Grasset ......................... | 405/77 |
| 2,485,543 A | * | 10/1949 | Andreau ....................... | 60/398 |
| 4,018,543 A | * | 4/1977 | Carson et al. ............ | 290/55 X |
| 4,070,131 A | * | 1/1978 | Yen ............................ | 290/55 X |
| 4,079,264 A | * | 3/1978 | Cohen .......................... | 290/55 |
| 4,172,689 A | * | 10/1979 | Thorsheim ................... | 290/42 |
| 4,179,886 A | * | 12/1979 | Tsubota ...................... | 415/3.1 |
| 4,288,985 A | | 9/1981 | Dyck | |
| 4,372,113 A | | 2/1983 | Ramer | |
| 4,868,408 A | * | 9/1989 | Hesh ............................ | 290/52 |
| 4,963,761 A | * | 10/1990 | Wight .......................... | 290/55 |
| 5,377,485 A | | 1/1995 | Bellamy | |
| 5,709,419 A | * | 1/1998 | Roskey ....................... | 290/55 |

FOREIGN PATENT DOCUMENTS

| | | | | |
|---|---|---|---|---|
| JP | 59-226282 A | * | 12/1984 | ................. 415/4.2 |
| RU | 1657723 A1 | * | 6/1991 | ................. 415/4.2 |

* cited by examiner

*Primary Examiner*—F. Daniel Lopez
(74) *Attorney, Agent, or Firm*—Woodard, Emhardt, Naughton, Moriarty & McNett

(57) ABSTRACT

A device for extracting energy from underwater fluid flows, comprising at least one fluid formation directing device (10) defining a constricted channel (20) arranged to cause fluid entering it to accelerate. A conduit (30) in fluid communication with a constricted portion of the channel (20) such that fluid is caused to flow in the conduit (30) in response to fluid flow through the channel (20). The conduit (30) can be connected to a fluid drivable engine (40) which can be positioned remotely from the channel (20), the fluid flow through the conduit (30) acting to drive the fluid drivable engine (40).

19 Claims, 7 Drawing Sheets

APPARATUS FOR EXTRACTING POWER FROM A FLUID FLOW

This invention relates to devices for extracting power from a fluid flow, such as a tidal stream, and structures for pumping fluids in response to such a flow.

With increasing public awareness of environmental pollution and in particular, global warming there is a growing interest in renewable energy sources. A 1994 survey of the energy available in sea or river currents and tidal streams around the UK by the Department of Trade and Industry's renewable energy unit at Harwell [see publication reference 1], found that a considerable fraction of the UK's energy needs could be met if this energy could be harnessed.

The energy in the currents is kinetic rather than potential, which means that it has to be extracted in a different way from that employed in a conventional hydroelectric scheme. Typically, in a tidal stream installation, a turbine might be placed underwater in the tidal stream to extract the energy—an underwater equivalent of a wind power generator. For example, in a development funded by the EC [2], it is planned to set up submarine propeller driven turbines in selected locations where the current flows rapidly A disadvantage of these conventional underwater systems is that in order to access the energy of the fluid flow the moving parts are placed underwater in a hostile environment making them prone to damage and inconvenient and costly to access and repair. Furthermore, if the water is slowed too much (i.e. too big a fraction of the kinetic energy is extracted), then the head needed to drive it will be increased. To minimise the required head, thereby obviating the need for a barrage, any turbine placed in the stream will have to have its blades highly feathered, making it uneconomic.

According to one aspect of the present invention there is provided an apparatus for extracting power from a fluid flow, the apparatus comprising at least one fluid directing formation formed to define a channel having a flow accelerating constriction shaped such that fluid in the channel is caused to accelerate as it flows through the flow accelerating constriction of the channel; a fluid drivable engine disposed at a position exterior to the channel; a conduit disposed to provide fluid communication between the fluid drivable engine and a portion of the channel having an accelerated fluid flow, the fluid drivable engine being arranged such that fluid flow along the conduit acts to drive the fluid drivable engine.

The apparatus of the present invention alleviates the disadvantages of the prior art by providing a way of using the underwater fluid flow to pump fluid away from the flow so that it can be led to a fluid drivable engine, such as a turbine, sited at position remote from the underwater fluid flow. This can avoid moving parts underwater and the correspondingly high maintenance costs. Furthermore, a controllable fraction of the power in any fluid flow can be extracted. It should be noted that the apparatus will function on any scale and as such is adaptable to many different situations. This property enables the system to be produced as modules that can be combined or used alone depending on circumstances. A further advantage of this apparatus is its low environmental impact: as much of the infrastructure is underwater the only visible signs are the fluid drivable engine housing and pylons bringing the power cables.

Although the conduit can be disposed in any portion of the channel having accelerated fluid flow, preferably it is sited in a portion of the channel formed to provide a maximum fluid velocity. This arrangement provides for increased efficiency of the apparatus.

In preferred embodiments, the at least one channel is substantially symmetrical about a plane mid-way between its ends. Although an asymmetrical channel is possible, and may even be preferable for extracting power particularly, from a one way flow, a symmetrical channel allows a single construction to be used for extracting power in both directions from a two way flow, such as a tidal flow.

Advantageously, the interior surface defining the channel is generally curved. A curved profile decreases the losses due to turbulence thereby allowing a greater flow velocity for the same head of fluid.

In an alternative embodiment, a fluid reservoir and a fluid communication path between the fluid drivable engine and the fluid reservoir are provided. Although in some embodiments, fluid may be expelled from the conduit and exit via the fluid drivable engine, and in others the suction from the conduit may be used to suck air through the fluid drivable engine, in this alternative embodiment a fluid reservoir is provided so that fluid is sucked from the fluid reservoir passes through the fluid drivable engine and is expelled via the conduit into the channel In preferred embodiments, the at least one fluid directing formation is arranged to define a plurality of channels arranged in parallel and having a corresponding plurality of conduits. The channels can be arranged in parallel in a single fluid directing formation or, alternatively, a plurality of fluid directing formations defining a plurality of channels can be arranged in parallel across the fluid flow. A plurality of channels arranged in parallel within the fluid flow allow an increase in the power extracted from a fluid flow. In addition multiplexing is simple; pipe connections to all fast streams in the vicinity can be connected in parallel to drive a single fluid drivable engine, thereby achieving economy of scale. Alternatively, a plurality of fluid drivable engines can each be arranged in fluid communication with a corresponding conduit and channel.

A multiplexed arrangement such as that described above allows small quantities of power to be extracted from a widely distributed area. This obviates the need for a large head of water, conventionally produced by a dam. Furthermore, the extraction of small quantities of power over a large area reduces the impact on existing eco-systems..

In some embodiments, a centrifugal pump having a fluid inlet and low velocity and high velocity fluid outlets is arranged in the channel such that the fluid-inlet receives fluid flowing through the channel, the low velocity fluid outlet being arranged to return fluid to the channel and the high velocity fluid outlet being arranged to expel fluid into the conduit. Thus, in this embodiment fluid exits via the conduit rather than being sucked into it.

Preferably, a generally flat circular drum with a fluid channel comprising a helix is arranged to receive fluid flowing through the channel such that fluid entering the drum forms a swirling disk and a portion of the fluid is expelled into the conduit. This arrangement allows fluid to be expelled into the conduit, without the provision of moving parts that are liable to wear and need servicing, within the fluid flow.

Advantageously, the circular drum has a double wedge shaped cross section, such that the cross section is wider at the outer circumference than it is in the middle section. This arrangement increases viscous drag in the central region and decreases the formation of vortices. In an alternative embodiment vortex formation is reduced by concentric vanes on the inside of the drum.

In preferred embodiments, the apparatus for extracting power comprises: at least two containers arranged in parallel in a fluid flow path between the channel and the fluid drivable engine, each container comprising a replenishment valve allowing fluid communication between the interior and exterior of the container; and an isolation valve arrangement such that the fluid communication between individual containers and the channel and fluid drivable engine can be inhibited, so that when a fluid contained in one container that is in fluid communication with the channel and fluid drivable engine is exhausted the isolation valve arrangement is operable to temporarily inhibit the fluid communication between the channel and fluid drivable engine via that container so that the container can be replenished using the replenishment valve. This embodiment allows an alternative fluid to that present in the fluid flow to flow between the tanks and the fluid drivable engine and to drive the fluid drivable engine. Thus, a fluid with a lower viscous drag than the fluid of the flow can be used to flow between the fluid drivable engine and tanks, reducing losses in the system. This is particularly important if the fluid drivable engine is located at some distance from the fluid flow as may be the case in, for example, tidal flows if the fluid drivable engine is located on shore. Furthermore, if the system is driving a gas turbine this arrangement acts to produce a reduced exhaust pressure for the gas turbine which increases its efficiency. It should be noted that this system is highly compatible with a gas turbine generator in which hydrocarbons are used to supplement, say tidal energy.

According to another aspect of the device there is provided a structure operable to pump fluid in response to underwater fluid flow, comprising at least one fluid directing formation formed to define a channel having a flow accelerating constriction shaped such that fluid in the channel is caused to accelerate as it flows through the low accelerating constriction of the channel; a conduit disposed to provide fluid communication between a portion of the channel having an accelerated fluid flow and a point exterior to the channel.

The structure of the present invention alleviates the disadvantages of the prior art by providing a way of using the underwater fluid flow to pump fluid away from the flow so that it can be led to a site remote from the flow, possibly an on shore site.

Embodiments of the present invention will now be described, by way of example only, with reference to the accompanying drawings, in which.

Figure 1:
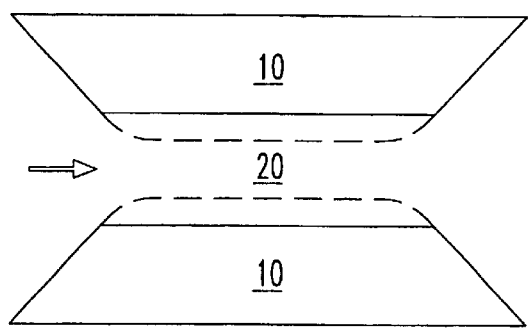
FIG. 1 illustrates the profile of an angular and smooth structure having a constricted channel.
Figure 2:
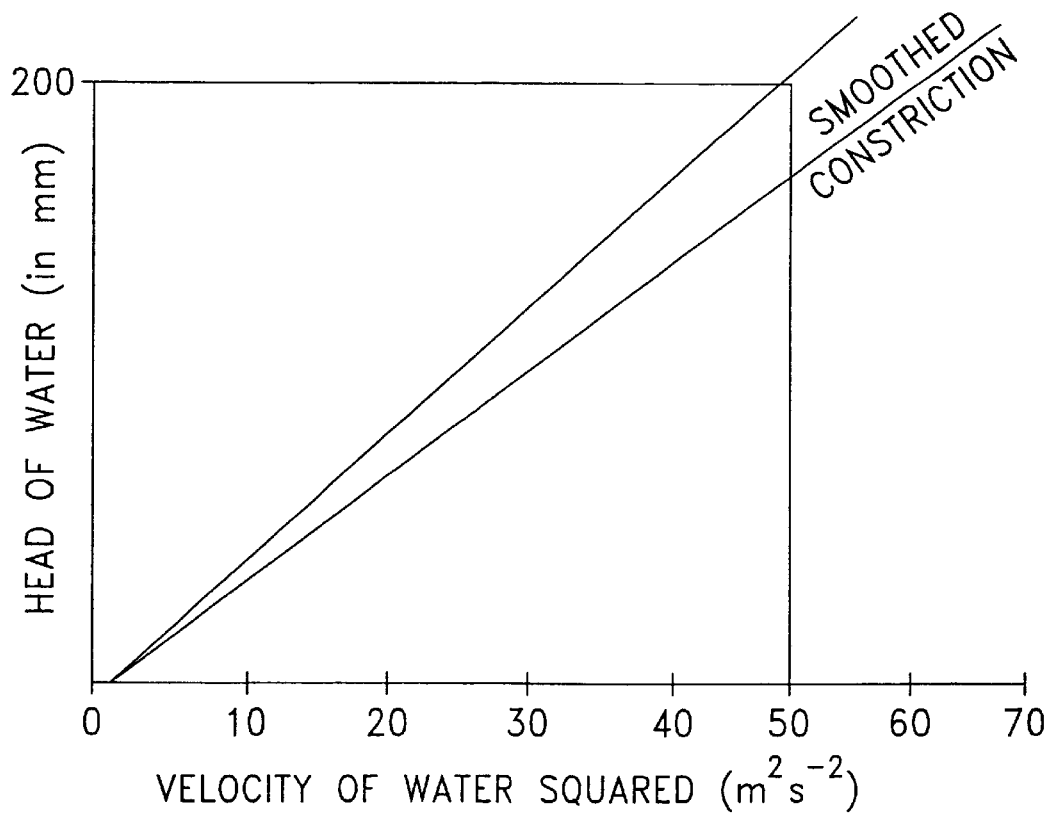
FIG. 2 illustrates the head of water needed to achieve a given speed for the two channels shown in FIG. 1.

FIGS. 1 and 2 relate to the technological background of the present invention, whereas FIGS. 3 to 8 relate to embodiments of the present invention.

Figure 10:
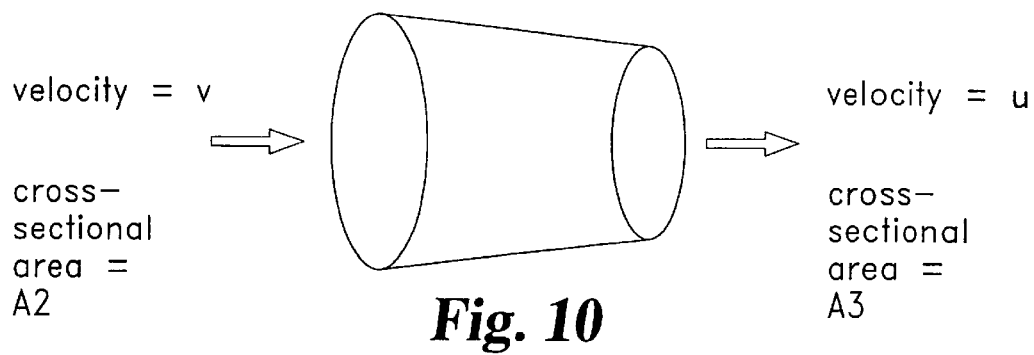

FIG. 10 is a schematic view of a pipe.

Figure 11:
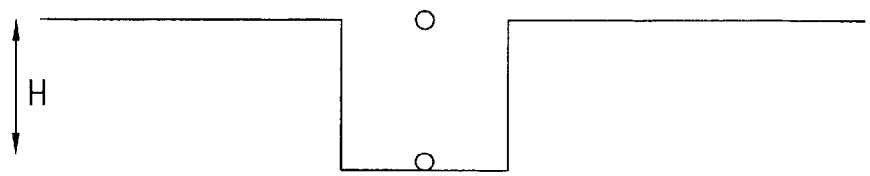

FIG. 11 is a diagram representation of height H.

Figure 12:
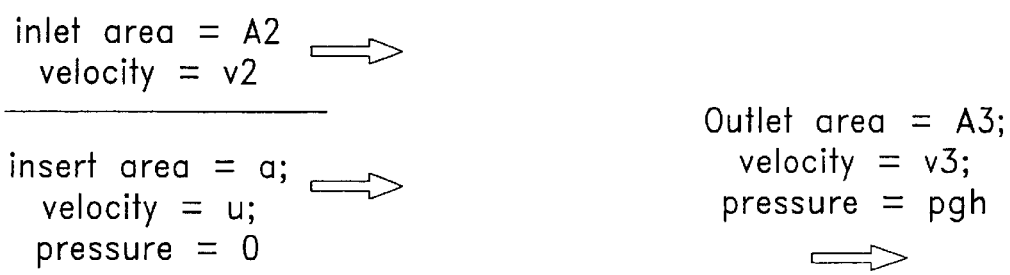

FIG. 12 is a diagram relating to the extraction of energy due to suction.

Figure 13:
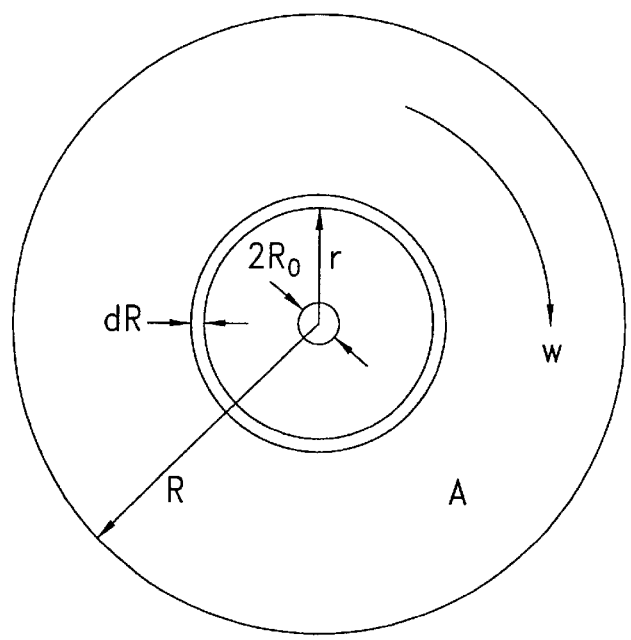

FIG. 13 is a view of a centrifungal pump.

Figure 14:
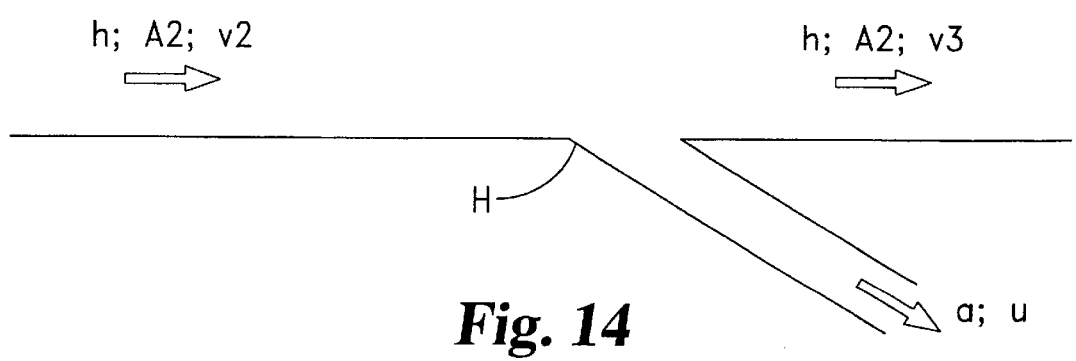

FIG. 14 is a diagram relating to conservation equations.

With reference to FIG. 1, a structure 10 providing a constricted channel 20 is illustrated schematically. The solid line represents a schematic diagram of an angular constricted channel 20 whereas the dotted line represents the smoothed version. The flow of fluid through narrow channels in which viscous forces are dominant and in which streamline flow is maintained are predicted by Bernoulli's theorem, wherein $v^2+\rho gh$ is constant. This means that provided no energy is lost through friction or in any other way, the effective pressure $\rho gh$ will go down as the speed increases. This principle forms the basis of a Venturi flow rate meter.

Laminar flow only occurs in tubes at relatively low velocities and with relatively small diameters, thus in a system with large flow rates turbulent flow will prevail. Even if the flow through a constriction is turbulent, the pressure still falls as the bulk velocity rises, as described by Bernoulli's equation. This is because, to conserve water the flow must accelerate as the tube narrows. Therefore a force has to be exerted on it, by pressure difference between the narrow and wide parts of the tube. A simple calculation (Appendix 1) and direct experiment shows that the pressure difference needed is that described by Bernoulli for streamline flow. Thus it seems that a pressure reduction is associated for turbulent flow just as for streamline flow.

Turbulent flow involves energy loss, so a head of water is required to force a fluid through a pipe. The more streamlined the pipe, the less turbulent the flow, so the design of a pipe affects the head of water needed to create flow. FIG. 2, illustrates the head of water (in mm) on the vertical axis and the velocity squared (in $m^2 S^2$) on the horizontal axis of water flowing through the smooth and angular channels illustrated in FIG. 1. The steeper line representing flow through the angular channel. As is clear from FIG. 2, the shape of the constricted channel influences the head of water needed to achieve a given speed. Thus, a smoothed constriction produces a larger flow of water for a given pressure drop. Clearly, a reduction of turbulent losses is important to the design of the device, as it produces a corresponding reduction in the head of water needed to produce satisfactory operation. Similarly the matching of the device to the particular conditions available, must form an important part of any practical application of this invention.

Figure 3:
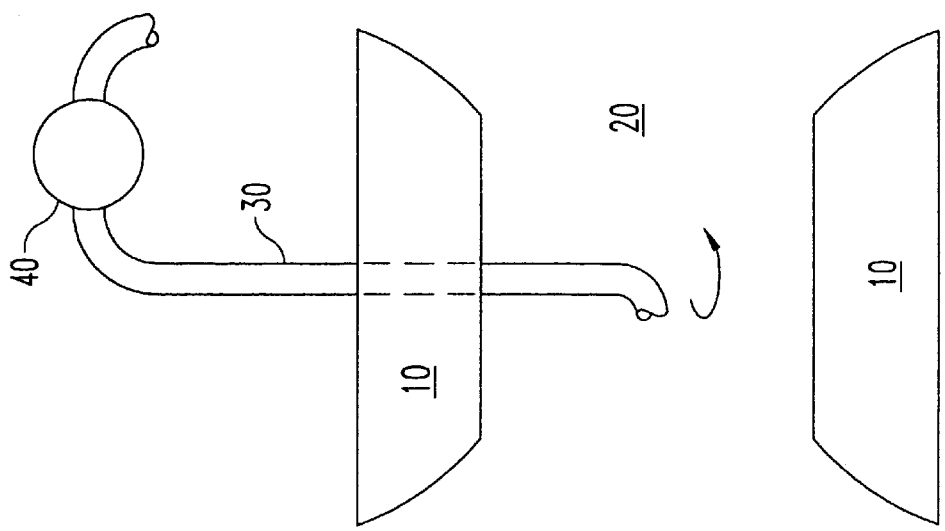
FIG. 3 illustrates an apparatus for extracting power from a fluid flow according to an embodiment of the invention.

FIG. 3, illustrates an apparatus for extracting power from a fluid flow according to an embodiment of the invention. In this device concrete structures 10 are sunk onto the bed of, for example, a tidal estuary. These are shaped to form a constricted channel 20. The dimensions of the concrete structure and constricted channel are typically an inlet diameter of about 10 m, a length of about 30 m, and a constricted diameter of 3 m. A pipe 30 from the surface of the sea is introduced into the centre of the high speed flow region of the channel. This pipe connects to a turbine 40 and then passes back into the sea. A turbine is taken, for the purpose of this document, to be any type of machine in which the kinetic energy of a moving fluid is converted into mechanical energy. The suction effect as described above (albeit in turbulent conditions), causes a pressure drop at the outlet of the pipe 30 within the channel 20. If water is allowed to flow down the pipe 30, then, in the absence of losses due to viscosity or turbulence, the speed of the main current through the channel 20 will remain unchanged; the potential energy lost by the free fall of the water from the surface down the pipe 30, driven in addition by atmospheric pressure from behind, will exactly equal its kinetic energy at the bottom, so that it will join the channel current with the same speed $v_1$. In fact, in this hypothetical situation no energy will have been gained or lost. Overall, water has come from the surface at $v_1$ and eventually been transferred to the depths at $v_1$, - convection has in effect occurred.

If however, the water in pipe 30 is made to do work on the way, then the resistance to flow will be increased, the speed of the fluid stream will be reduced and energy will be extracted from the submarine current. Thus, by making the water in the pipe do work by, for example, driving turbine 40, power can be generated at a place remote from the underwater current such as on shore. The placing of the turbine on shore makes it convenient for servicing access and subject to less extreme conditions than it would be underwater.

Figure 9:
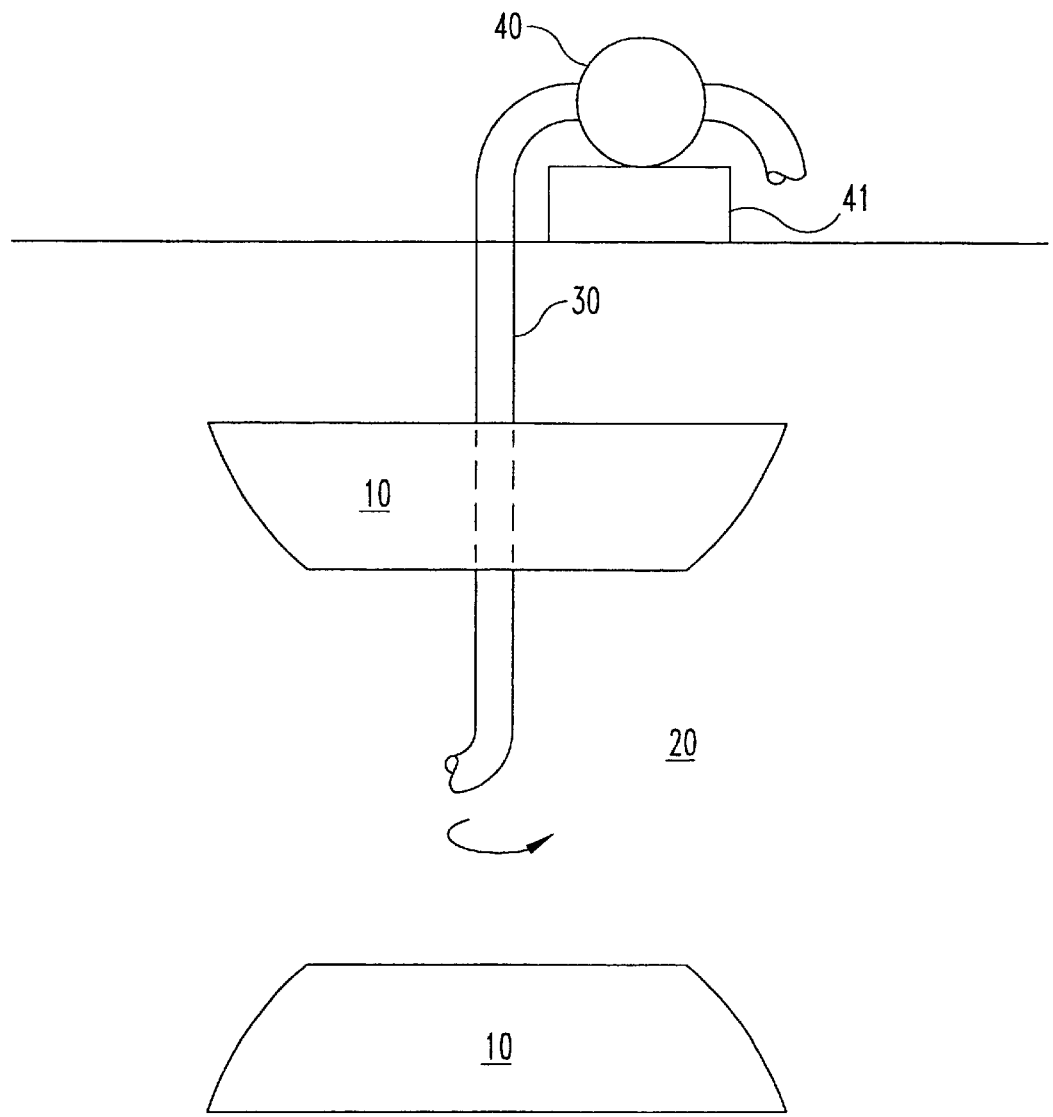
FIG. 9 illustrates an apparatus for extracting power from a fluid flow according to an embodiment of the present invention.

FIG. 9 illustrates an embodiment in which an apparatus for extracting power includes an underwater fluid flow and at least a portion of the at least one fluid directing formation, such as structure 10, is located underwater. The apparatus further comprises a floating structure 41 with the fluid drivable engine 40 being disposed on the floating structure 41.

The fact that turbulent flow produces pressure reduction analogous to that produced by laminar flow means that large flow rates of water can be used in the device of the present invention. The data illustrated in FIG. 2 show that for an efficient system a smoothed profile for the constricted channel 20 is preferred.

The slowing down of the channel current by the introduction of water down the pipe 30 from the surface will result in an increase of pressure on the outlet side. In order for the system to work, the pressure difference between the two ends of the channel 20 through the concrete structure 10 must exceed this increase. Thus a limit is set to the quantity of water that can be sucked down the pipe by the head of water available. In a tidal flow the maximum head available is of the order of the height of the tide.

Appendix 2 shows that a power output of 1.5 MW requires a hydrostatic pressure of 10 cm in the 30 m length of the concrete submarine structures over and above that needed to force the water through the channel at 20 m/s in the absence of power extraction. This is an additional water gradient of 3 m in 1 km which is not unusual. Alternatively, the extra height differential of 10 cm could be created locally if a line of concrete structures formed a submarine barrage.

In the embodiment shown in FIG. 3, the constricted channel 20 is symmetrical and the conduit 30 can be rotated, for example, by the water flow itself, such that the outlet can face either channel opening. This makes the structure suitable for extracting energy from fluids flowing in either direction in the constricted channel 20 and thus can be used to extract energy from flows that periodically change direction such as tidal flows. Embodiments of the invention designed to be used, for example, in one way fluid flows may have asymmetrical constricted channels. Asymmetric channels may also be used in some situations for two way flows. This is because streamline structures are not reversible and thus for maximum power extraction efficiency a channel specially shaped for streamlined flow in a particular direction may be preferred. Thus, in some situations it may be advantageous to provide separate differently shaped channels for the two flow directions. A disadvantage of doing this is an increase in the capital cost associated with providing the additional channels.

In the embodiment shown, the channel 20 is formed within the concrete structure 10. An alternative in which two concrete structures form a constricted channel, the structures possibly being modified bridge supports is also possible. In certain situations, such as in shallow estuaries, the channels may also be formed from a "picket fence" type structure.

Figure 4:
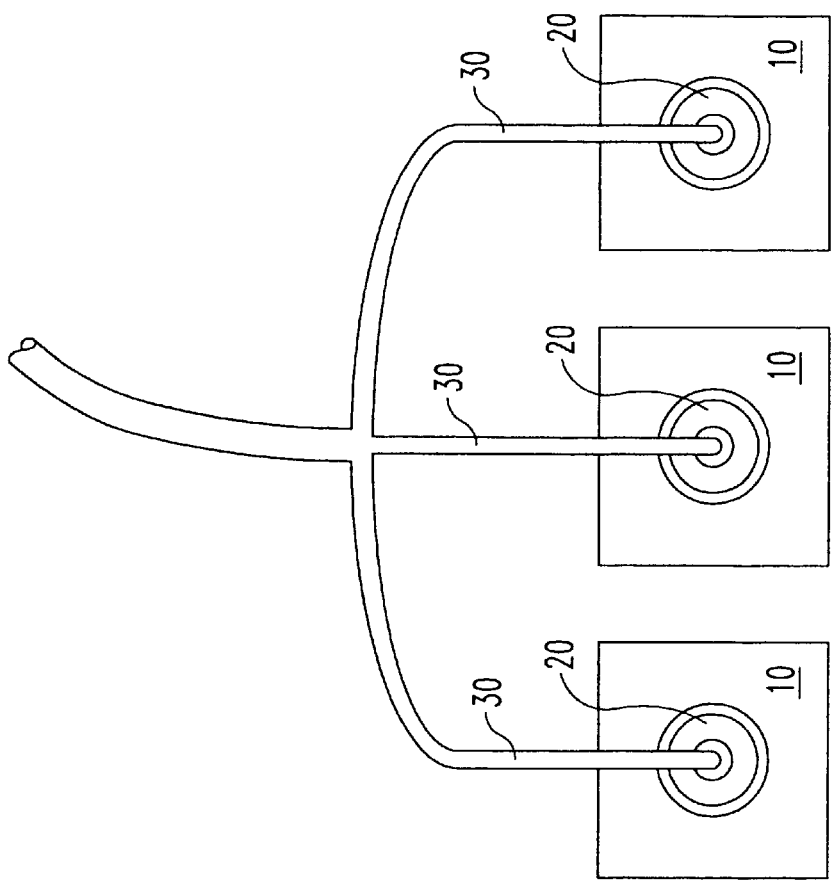
FIG. 4 illustrates a plurality of structures each comprising a constricted channel and conduit connecting the constricted channels to each other and to an external pipe.

FIG. 4, illustrates a front elevation of a plurality of structures 10 with constricted channels 20 arranged in parallel within a fluid flow. A plurality of conduits 30 are arranged to connect the constricted portion of each channel 20 together and then to a single turbine 40. Thus, the portion of the energy extracted from a stream can be increased, and a greater flow produced to drive the turbine 40. Such an arrangement could be sited across, for example, a tidal estuary so that energy could be efficiently harnessed from across a wide flow. In another embodiment, a plurality of turbines 40 are placed in fluid communication with each conduit 30.

In alternative embodiments, the fluid flow is used to expel fluid from the conduit rather than sucking it into it.

Figure 5:
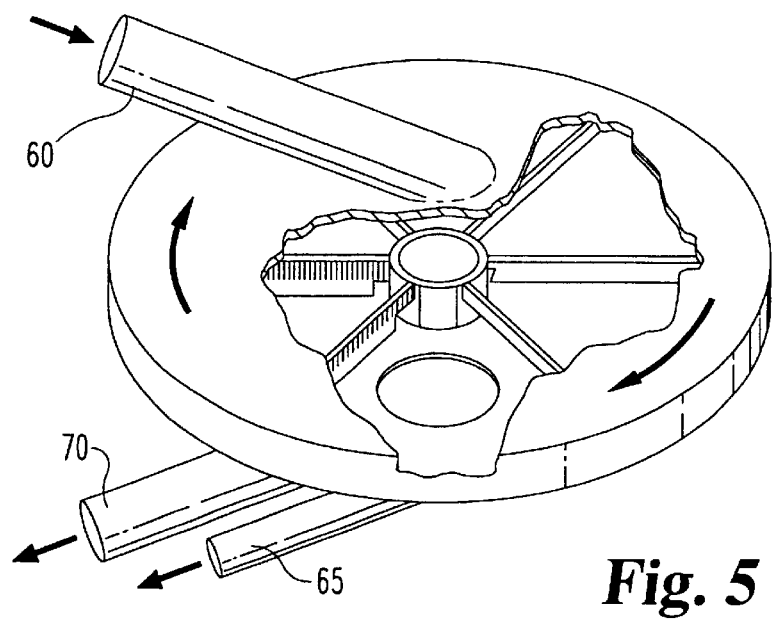
FIG. 5 illustrates a centrifugal pump activated by a low pressure stream of water.

It is clear that an underwater flow such as a tidal stream could be made to drive a centrifugal pump. A "water wheel" type device, for example, could be placed in a narrow portion of the channel and be used to drive a centrifugal pump mounted on the same axis. As a further refinement, the water wheel and pump could be combined into one unit as shown schematically in FIG. 5. In the device of FIG. 5, the vanes of the pump 50 are driven round by the fast water inflow, and a fraction of the total water throughput, say 10%. is taken off at the edge of the drum where both the pressure and the speed are high.

It is clear from FIG. 5 that, if the water enters at high speed and low pressure through pipe 60, it will have a similar speed and higher pressure, due to centrifugal force, when it reaches the entrance to the peripheral take off pipe 65. If some water, say 10% of the total flow, is allowed to flow out through pipe 65, the remaining flow will exit at a lower speed through outlet pipe 70. A small fraction of the water has thereby obtained a high speed and pressure at the expense of the remainder slowing down.

The vanes have the effect of forcing the water to rotate as though it were a solid.

Appendices 2 and 3 give calculations showing fluid acceleration in a centrifugal pump and conservation of fluid and momentum when a fraction of the flow is bled off. If we consider water being compelled to move around a vertical axis with uniform angular velocity $\omega$ and that its velocity at the outer perimeter is $v_2$. Due to so called "centrifugal force", there will be a radial pressure gradient from the hub to the rim of the disk of the liquid. A simple integration (Appendix 2) shows that this gives a pressure difference between the hub and rim of $2\rho gh$. The pressure on the inside of the outer surface of the circular drum must therefore be at least equal to this. In other words, the centrifugal force compensates for the loss in pressure predicted by Bernoulli's equation when the water speeds up from 2 m/s to 20 m/s as it negotiates the throttle. This means that, at the periphery of the drum, a stream of fluid, a fraction of the fluid flowing through the constriction can be bled off at a pressure of at least $2\rho gh$ and a speed of 20 m/s. If an underwater water flow such as a tidal flow is being considered, the stream of fluid can be bled off and led via a suitable pipe to sea level. The fluid flow should arrive at sea level at a speed of 20 m/s and at least at atmospheric pressure. If its speed is reduced, its pressure will increase correspondingly.

In another embodiment the mechanical intermediary (the vanes of FIG. 5) can be omitted and the fluid persuaded to act as its own centrifugal pump.

Figure 6:
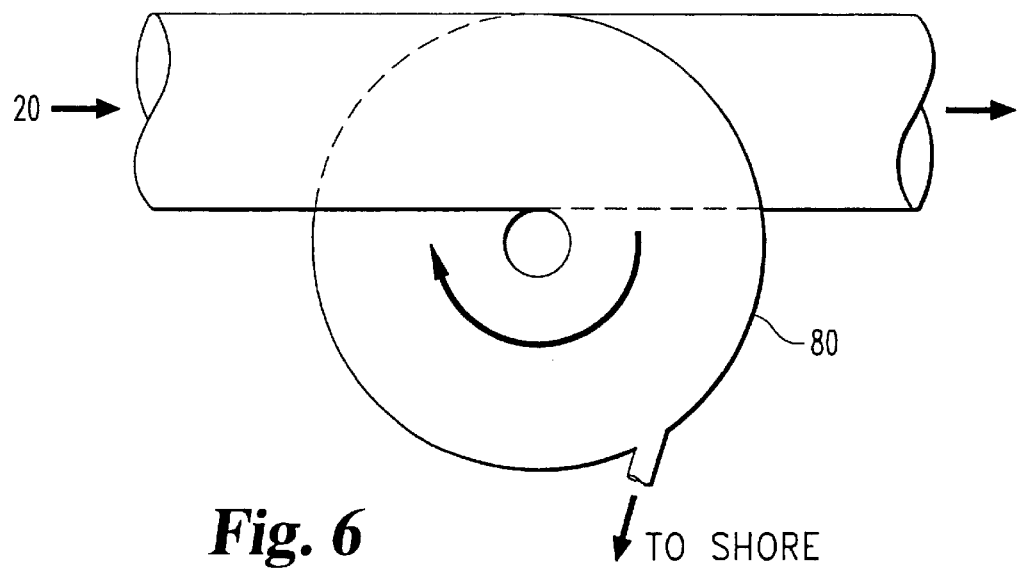
FIG. 6 illustrates a self-acting centrifugal pump.

FIG. 6 illustrates a flat circular drum 80, split and twisted slightly to form a helix. This forces the fluid to form a swirling disc similar to that formed by the pump of FIG. 5, but without any mechanical moving parts.

If viscous forces are dominant then the fluid would move through the circular drum 80 as though it were a solid disc. If, however, viscous forces are not dominant then vortices form to conserve angular momentum. This has the effect of speeding up the flow near the centre of the disc and slowing it down at the periphery—the opposite of what is needed.

Figure 7:
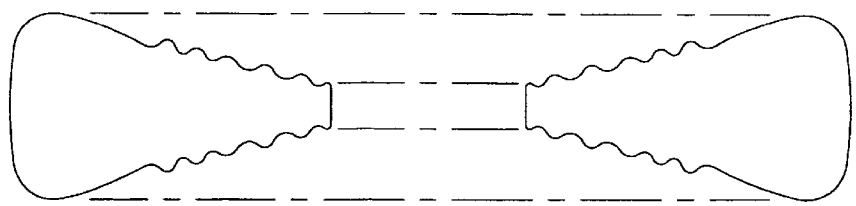
FIG. 7 illustrate the cross section of the self-acting centrifugal pump of FIG. 6.

In order to circumvent this problem a drum with a wedge shaped cross-section, as illustrated in FIG. 7, may be used. This increases viscous effects near the centre, where the surfaces of the drum are close together, and decrease them at larger radii, while still maintaining the radial pressure gradient. Another option would be to fit concentric vanes on the insides and top and bottom surfaces of the drum to inhibit flow vectors which incorporate a radial component. As the exact form of radial velocity gradient is not too critical, a self-driven centrifugal pump may possess a wide range of such mechanical configurations.

Figure 8:
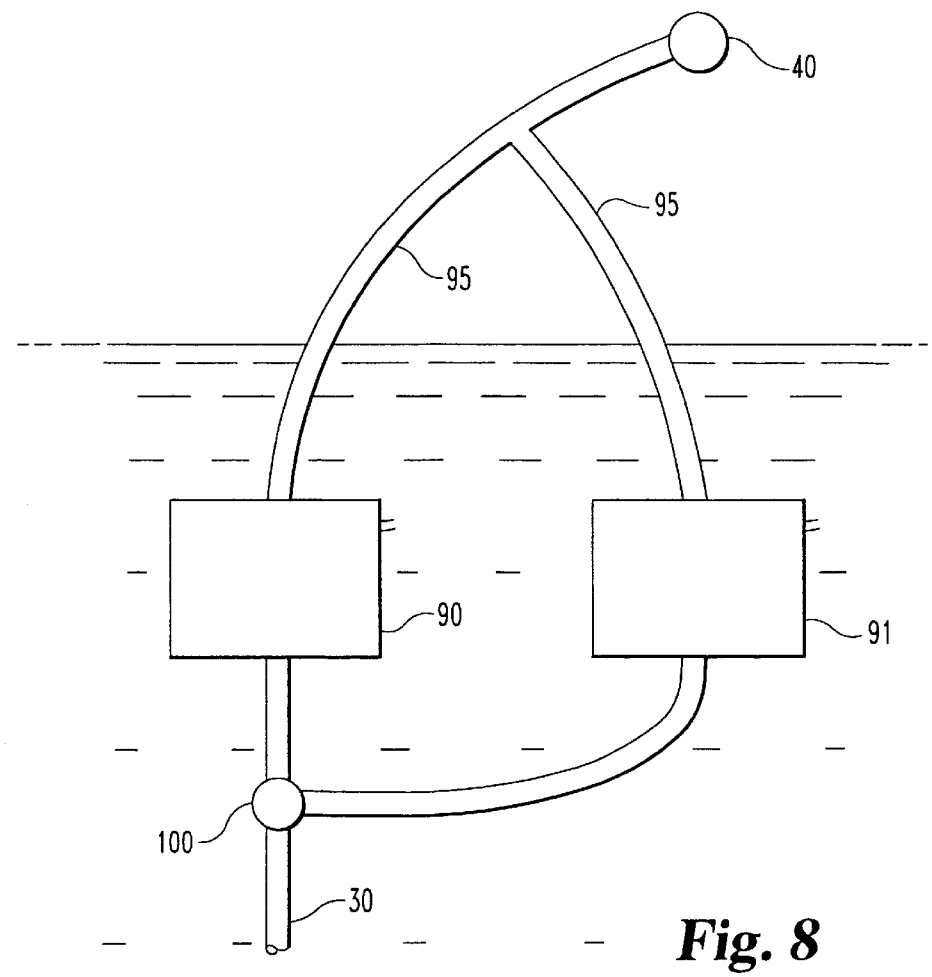
FIG. 8 illustrates the fluid communication means, turbine and buffer tanks of an embodiment of the invention.

FIG. 8 illustrates the fluid communication means, turbine and buffer tanks of an embodiment of the invention. In this embodiment buffer tanks 90, 91 are located between the conduit 30 and turbine 40. These tanks 90, 91 are located underwater near to the underwater fluid flow. Fluid communication means 95 connect these tanks to the turbines. Valve 100 connect alternate tanks 90, 91 to the conduit 30 and turbine 40, such that water is sucked from a full tank 90 through the conduit 30 into the channel 20; air flows through the turbine 40 and fluid communication means to replace the water flowing from the tank 90. When this tank 90 is empty of water and full of air, the valve 100 switches such that the other tank 91 that is full of water becomes connected to the conduit 30 and water is sucked from this other tank 91. While this tank 91 is emptying valve 100 on tank 90 opens to allow this tank to fill with water. Other valve means (not shown) on the tank are opened to allow the air to be exhausted. This arrangement means that instead of water flowing between the turbine 40 and underwater fluid flow, air flows for some of this distance. Thus, if the turbine 40 is located on shore at a remote distance from the underwater flow, the tanks can be arranged such that the majority of the distance is covered by the air flow and thus viscous losses caused by fluid flow between the turbine 40 and the underwater structure are reduced.

In conclusion, calculations have shown that a stream of water can be made available on the shore with a flow rate of 14 m/s and a pressure differential of about 2 atmospheres, neglecting friction and viscosity from an offshore current flowing at 2 m/s at a depth of about 9 m (30 feet). All that is required to achieve this is a structure, preferably concrete, that can be manufactured in a shipyard and sunk on site, and through which appropriately shaped channels have been sculpted, together with the necessary connecting pipes. A concrete structure has the advantage of being buoyant when water is pumped out of it, allowing it to be floated for cleaning or for relocation to another site.

Publication References 1. 1994 survey of the energy available in currents and tidal streams around the UK by the DTI's renewable energy unit at Harwell (ETSU T/f05/00155/REP).

2. 1996, Fraenkel et al., "Power of Motion in the Ocean", Anjana Ahuja, The Times Jul. 10, 1998.

APPENDIX 1 Justification of "Simple calculation"

Consider the movement of a molecule of mass within the pipe as shown in FIG. 10.

The equation of continuity states that:

$A_2 v = A_3 u$

As $A_2 > A_3$ then $u > v$. Hence the kinetic energy of the molecule will increase from $(\frac{1}{2})mv^2$ to $(\frac{1}{2})mu^2$.

To conserve energy, the potential energy of the molecule must have deceased, i.e. the molecule must have "fallen" through a height H (see FIG. 11) where:

$$mgH = \frac{1}{2}m(u^2 - v^2)$$

In a liquid, the height through which a molecule can "fall" is increased as the local pressure is reduced. Hence the pressure at the end of the pipe is an amount $\rho g h$ lower than at the entrance to the pipe.

Hence we have that:

$$\frac{1}{2}\rho(u^2 - v^2) = \rho g(h_1 - h_2)$$

as required.

APPENDIX 2 Extraction of energy due to suction (see FIG. 12)

where: $v_2 > v_3$ and so the pressure at outlet has increased by an amount $\rho g h$;

h=head of water needed to drive the water through

Sum of areas: (1)

$A_2 + a = A_3$

Conservation of water: (2)

$A_2 v_2 + au = A_3 v_3$

Conservation of energy (3)

$$\frac{v_2^2}{2g}(A_2 v_2) + \frac{u^2}{2g}(au) = \left\{\frac{v_3^2}{2g} + h\right\} A_3 v_3$$

Using (1) and (2) to eliminate $v_3$ and $A_3$, then: (4), $$\frac{v_2^2}{2g}(A_2 v_2) + \frac{u^2}{2g}(au) = \frac{1}{2g}\left\{\frac{(A_2 v_2 + au)^3}{(A_2 + a)^2}\right\} + h(A_2 v_2 + au)$$

Putting $A_2 = 10a$ simplifies (4) to: (5)

$0.2v_2^3 + 0.02u^3 + 0.01v_{23} + 0.1u^3 = 0.3v_2^2 u + 0.03u^2 v_2 + 2gh(1.1)^2 (v_2 + 0.1u)$

Suppose that the velocity, u in the insert is some fraction, $\beta$ of the inlet velocity, $V_2$. i.e.: (6)

$u = \beta v_2$

Then (5) becomes: (7)

$0.12\beta^3 - 0.03\beta^2 - 0.3012\beta + 0.198 = 0$

Let $0.12\beta^3 - 0.03\beta^2 - 0.3012\beta + 0.198 = X$ and find the value of $\beta$ for which X is close to zero. Using numerical methods it is found that $\beta = 0.8$ when $X \approx 0$.

Suppose that the velocity into the inlet, $v_2$ is 20 ms$^{-1}$ then the velocity in the insert, u is 16 ms$^{-1}$ from (6).

The energy per unit time (i.e. power) extracted from the system is:

$$P = \frac{1}{2}v_2^2 \frac{A_2}{10}(v_2(1-\beta))^3$$

$$\therefore P = \frac{1}{2} \cdot 1000 \cdot (0.7) \cdot (20)^3 \cdot (1-(0.8)^3) = 1.43 \text{ MW}$$

is obtained from a device with an inlet diameter of 10 m and a pipe throttle of diameter 3 m and area $A_2 = \pi \cdot (1.5)^2$.

N.B. This is the head needed to supply the power calculated above. A greater head of water will be needed to overcome turbulent flow.

APPENDIX 3: Centrifungal Pump (See FIG. 13).

Caption: A disk of water, inner radius $R_0$, outer radius $R$, rotating at angular velocity $\omega$ has a pressure differential between its centre and circumference.

Water in a cylindrical container, height h, inner radius $R_0$, outer radius R, is rotating at angular velocity $\omega$. The mass of liquid in a thin cylinder height h and thickness dr at radius r is dm=2πtρhdr The centrifugal force exerted by this is $dF = r\omega^2 dm$. Hince the outward pressure across dr is $dP = dF/2\pi rh = \rho r \omega^2 dr$ Integration of this between $R_0$ and R shows that there is a pressure difference between the inner and outer walls of the container equal to $$P_R - P_{R_0} = \rho \omega^2 \frac{(R^2 - R_0^2)}{2}$$

So, if $R \gg R_0$, $$P_R - P_{R_0} = \rho \omega^2 \frac{R^2}{2} = \frac{\rho v^2}{2} \text{ (if } \omega R = v\text{)}$$

According to Bernoulli's theorem, the total energy content of the water must be conserved, provided it is flowing along a streamline path. We have achieved this by slowing down the water near the centre of the disk, and using the kinetic energy so released to increase the pressure at the circumference. Furthermore, we can say that if the kinetic energy content of the water in the rotating disk has come predominantly from its hydrostatic content when flowing into the venturi at a low speed, then, according to Bernoulli's equation, $v^2/2g = H$ where $\rho gH$ is the hydrostatic pressure. Hence, as $P_{RO}$ cannot be less than zero, the pressure at the circumference of the cylinder should be similar to the hydrostatic pressure of the water at the point at which it enters the venturi.

APPENDIX 4: CONSERVATION EQUATIONS

The caption for FIG. 14 is as follows: The water enters the central section of the venturi at speed $v_2$. We suppose that a fraction is bled off at speed u, and that the speed at which the remainder exits the central section of the venturi is $v_3$.

Area of the pipe, and area of main exit pipe is $A_2$. Area of bleed pipe to shore is a. The hydrostatic pressure is $\rho gh$ at the venturi inlet and outlet, where $h \approx 0$, and $\rho gH$ at the side tube.

1. CONSERVE WATER $A_2 v_2 = A_2 v_3 + au$ so $a = A_2(v_2 - v_3)/u$ (1)

provided $V_3 < V_2$.

2 CONSERVE ENERGY

In other words, ensure that power in=power out. So, for unit mass of water, $$\left(\frac{v_2^2}{2g} + h\right) A_2 v_2 = \left(\frac{v_3^2}{2g} + H\right) A_2 v_3 + \left(\frac{u^2}{2g} + H\right) au$$

$$= \left(\frac{v_3^2}{2g} + H\right) A_2 v_3 + \left(\frac{u^2}{2g} + H\right) A_2(v_2 - v_3)$$

using (1). Hence $$\frac{(v_2^3 - v_3^3)}{2g} + h(v_2 - v_3) = \left(\frac{u^2}{2g} + H\right)(v_2 - v_3)$$

Therefore, provided $v_2$ does not equal $v_3$, we obtain (2)

$$\left(\frac{u^2}{2g} + H\right) = h + \frac{(v_2^2 + v_2 v_3 + v_3^2)}{2g}$$

What does this mean in practice? It means that provided the local pressure near the bleed off tube can be increased to H (by invoking centrifugal force, for instance), then the relationship expressed by the above equation can be satisfied.

3. EXAMPLE

For example, make the area of the bleed off pipe 10% of that of the main central venturi tube, so $a = A_2/10$. This defines the geometry, and means that $u = 10(v_2 - v_3)$. In addition, let $v_3 = 9v_2/10$. This defines the quality of kinetic energy that has been removed from the main flow. So, $u = v_2$ and to satisfy equation (2)

$H - h = 0.85 v_2^2/2$ g

We have already seen from Appendix 1 that centrifugal forces can be used to raise the equivalent depth to $v_2^2/2$ g.

To put this another way, if water can be forced out of the side tube by centrifugal force, then, depending on the effective value achieved for H, $v_3/v_2$ will fall to the fraction defined by equation (2).

What is claimed is:

1. An apparatus for extracting power from a water flow, the apparatus comprising:

at least one at least partially underwater fluid directing formation formed to define a channel having a flow accelerating constriction shaped such that water flows through the channel and is caused to accelerate as it flows through the flow accelerating constriction of the channel;

a fluid drivable engine disposed at a position exterior to the channel;

a conduit disposed to provide fluid communication between the fluid drivable engine, an open end of said conduit extending into said flow accelerating constriction and a portion of the channel having an accelerated fluid flow, the fluid drivable engine being arranged such that fluid flow along the conduit caused by reduced pressure at said open end of the said conduit acts to drive the fluid drivable engine.

2. An apparatus for extracting power according to claim 1, wherein the conduit is arranged to provide fluid communication between the fluid drivable engine and a portion of the channel formed to provide a maximum fluid velocity.

3. An apparatus for extracting power according to claims 1 or 2, wherein the exterior of the channel in a fluid flow direction is enclosed by the at least one fluid directing formation and an inlet of the channel has a larger cross sectional area than a central section of the channel.

4. An apparatus for extracting power according to claim 1, wherein the at least one channel is substantially symmetrical about a plane mid-way between its ends.

5. An apparatus for extracting power according to claim 1, wherein the interior surface defining the channel is generally curved.

6. An apparatus for extracting power according to claim 1, wherein the conduit is flexible.

7. An apparatus for extracting power according to claim 1, comprising a fluid reservoir and a fluid communication path between the fluid drivable engine and the fluid reservoir.

8. An apparatus for extracting power according to claim 1, comprising an electricity generator, the generator being arranged to be driven by the fluid drivable engine.

9. An apparatus for extracting power according to claim 1, the apparatus further comprising a floating structure, the fluid drivable engine being disposed on the floating structure.

10. An apparatus for extracting power according to claim 1, wherein the at least one fluid directing formation is arranged to define a plurality of channels arranged in parallel, having a corresponding plurality of conduits.

11. An apparatus for extracting power according to claim 10, wherein the plurality of conduits are arranged in fluid communication with each other and with the fluid drivable engine.

12. An apparatus for extracting power according to claim 10, wherein the apparatus for extracting power comprises a plurality of fluid drivable engines, each in fluid communication with a corresponding conduit and channel.

13. An apparatus for extracting power according to claim 1, comprising a centrifugal pump having a fluid inlet and low velocity and high velocity fluid outlets, the pump being arranged within the channel such that the fluid inlet receives fluid flowing through the channel, the low velocity fluid outlet being arranged to return fluid to the channel and the high velocity fluid being arranged to expel fluid into the conduit.

14. An apparatus for extracting power according to claim 1, comprising a generally flat circular drum with a fluid channel comprising a helix, the drum being arranged to receive fluid flowing through the channel and comprising a fluid outlet arranged in fluid communication with the conduit, such that fluid entering the drum forms a swirling disk and a portion of the fluid is expelled into the conduit.

15. An apparatus for extracting power according to claim 14, wherein the circular drum has a double wedge shaped cross section, such that the cross section is wider at the outer circumference than it is in the middle section.

16. An apparatus for extracting power according to claim 14, wherein the generally flat circular drum comprises concentric vanes inside the drum.

17. An apparatus for extracting power according to claim 1, the apparatus for extracting power comprising:

at least two containers arranged in parallel in a fluid flow path between the channel and the fluid drivable engine, each container comprising a replenishment valve allowing fluid communication between the interior and exterior of the container; and an isolation valve arrangement such that the fluid communication between individual containers and the channel and fluid drivable engine can be inhibited, so that when a fluid contained in one container that is in fluid communication with the channel and fluid drivable engine is exhausted the isolation valve arrangement is operable to temporarily inhibit the fluid communication between the channel and fluid drivable engine via that container so that the container can be replenished using the replenishment valve.

18. A structure operable to pump fluid in response to underwater fluid flow, comprising at least one fluid directing formation formed to define a channel having a flow accelerating constriction shaped such that fluid in the channel is caused to accelerate as it flows through the flow accelerating constriction of the channel; and a conduit disposed to provide fluid communication between a portion of the channel having an accelerated fluid flow and a point exterior to the channel, an open end of said conduit extending into said flow accelerating constriction.

19. An apparatus for extracting power from a water flow, the apparatus comprising:

at least one at least partially underwater fluid directing formation formed to define a channel having a flow accelerating constriction shaped such that water flows through the channel and is caused to accelerate as it flows through the flow accelerating constriction of the channel;

a fluid drivable engine disposed at a position exterior to the channel;

a floating structure, the fluid drivable engine being disposed on the floating structure; and a conduit disposed to provide fluid communication between the fluid drivable engine and a portion of the channel having an accelerated fluid flow, the fluid drivable engine being arranged such that fluid flow along the conduit acts to drive the fluid drivable engine.

* * * * *